United States Patent
Outon Hernández et al.

(10) Patent No.: US 9,440,725 B2
(45) Date of Patent: Sep. 13, 2016

(54) REINFORCED STRINGER AND METHOD OF MANUFACTURE THEREOF

(71) Applicant: AIRBUS OPERATIONS, S.L., Getafe (ES)

(72) Inventors: Ignacio Outon Hernández, Getafe (ES); Yolanda Miguez Charines, Getafe (ES); Oscar Miguel Macías Jareño, Getafe (ES); Juan José Pastrana Bermejo, Getafe (ES); Antonio Torres Esteban, Getafe (ES)

(73) Assignee: AIRBUS OPERATIONS S.L., Madrid (ES)

( * ) Notice: Subject to any disclaimer, the term of this patent is extended or adjusted under 35 U.S.C. 154(b) by 149 days.

(21) Appl. No.: 14/139,147

(22) Filed: Dec. 23, 2013

(65) Prior Publication Data
US 2014/0186578 A1 Jul. 3, 2014

(30) Foreign Application Priority Data

Dec. 26, 2012 (EP) .................................. 12382536

(51) Int. Cl.
*B64C 1/06* (2006.01)
*B29C 70/34* (2006.01)
*B29D 99/00* (2010.01)

(52) U.S. Cl.
CPC ............... *B64C 1/064* (2013.01); *B29C 70/34* (2013.01); *B29D 99/0003* (2013.01); *Y02T 50/433* (2013.01); *Y10T 156/1043* (2015.01); *Y10T 428/24174* (2015.01)

(58) Field of Classification Search
CPC ..................... B64C 1/064; Y10T 428/24174
USPC ............................................................ 428/99
See application file for complete search history.

(56) References Cited

U.S. PATENT DOCUMENTS

| 4,811,540 A | * | 3/1989 | Kallies | ............... | B29D 99/0014 |
| | | | | | 244/123.3 |
| 2009/0176066 A1 | | 7/2009 | Darrow | | |

FOREIGN PATENT DOCUMENTS

EP 0 248 161 12/1987

OTHER PUBLICATIONS

Extended European Search Report for Application No. 12382536.6 dated Jun. 26, 2013.

* cited by examiner

*Primary Examiner* — Brent O'Hern
(74) *Attorney, Agent, or Firm* — Jenkins, Wilson, Taylor & Hunt, P.A.

(57) ABSTRACT

The present invention relates to a stringer, particularly to a stiffening and structural longitudinal element for skin of aircraft airfoil surfaces, characterized in that it incorporates two separate and independent reinforcement areas, one in the foot and the other at the end of the web (head) of the stringer, where the reinforcement areas are obtained by a widening of the section of the stringer, the widening being formed by a localized stack of reinforcing plies of composite material which are embedded within the stringer. The invention also relates to the method of manufacture and is particularly applicable to stringers having an L-shaped or T-shaped section.

11 Claims, 7 Drawing Sheets

REINFORCED STRINGER AND METHOD OF MANUFACTURE THEREOF

CROSS-REFERENCE TO RELATED APPLICATION

This application claims priority to and the benefit of European Patent Application No. EP 12382536.6, filed Dec. 26, 2012, the entire disclosure of which is incorporated by reference herein.

TECHNICAL FIELD

The present invention generally relates to the manufacture of components for aircraft, such as stringers or similar structural elements such as reinforcing profiles, by means of composite materials.

More specifically, one of the objects of the invention is to provide more impact-resistant and more structurally efficient stringers in a simple manner and without modifying the already existing methods of manufacture, increasing the inertia of said stringers and reducing their overall thickness.

BACKGROUND

In manufacturing components for the aeronautical industry, especially for manufacturing structural elements of an aircraft, the use of composite materials formed by fabrics with an organic matrix, for example a thermoplastic resin, and continuous fibers, for example glass fiber- or carbon fiber-reinforced plastic (CFRP), oriented in one direction in one and the same ply or fabric is well known.

These composite materials are used both for manufacturing skin panels and for manufacturing stringers, which can be manufactured with different sections, for example with a T-shaped section, I-shaped section, L-shaped section, trapezoidal-shaped section, etc.

An aircraft skin structure, for example part of the fuselage or part of a wing, is conventionally formed by a skin panel and by a series of stringers co-bonded or co-cured to one of the faces of the panel to reinforce it. The stringers are arranged in the longitudinal direction with respect to said panel, and a series of transversely arranged ribs collaborating with the stringers to provide strength to the panels and to improve the stability under compression or shearing thereof are further incorporated.

One of the most common stringer profiles is the T-shaped profile, which is obtained by means of attaching two L-shaped profiles. The co-curing of composite materials consists of the joint curing of two or more parts inside a furnace without either of them having first gone through a prior curing process.

The possibility of incorporating reinforcements integrated in the web of the stringer as shown in FIG. 1 is known. A reinforcing element (17) consisting of a solid block obtained, for example, by means of unidirectional fibers is manufactured separately in those processes, such that in manufacturing the stringer a planar stack of fabrics (FIG. 2A) is used as the starting material, in which a channel (18, 19) (FIG. 2B) is formed by means of a bend in the sheet, within which bend the reinforcing element (17) (FIG. 2C) is placed. Finally, the profile is closed on itself, turning it into T-shaped by means of the suitable tool (FIG. 2D), and the assembly is cured, the reinforcement (17) being housed in the head of the web.

These known processes are used to provide reinforcement exclusively at the end of the head of the web, but not anywhere else in the stringer. Furthermore, as seen in the sequence of FIGS. 2 (A-D), it is necessary to greatly modify the process of manufacture and the necessary tool because the reinforcement must be manufactured separately, after placing the reinforcement in the plies to subsequently fold the profile.

The structural performance of the profile thus obtained is not completely effective because the reinforcing element is after all an independent body resulting from the basic stacking of plies. The reinforcement is housed inside the stringer, which means, as seen in FIGS. 1A and 1B, that the reinforcement does not extend up to the very edge of the head of the web, but rather that end is formed by the basic stacking of the stringer which is exposed to possible damage due to impact.

Current T-shaped profiles cannot have a reinforcement in the foot and another one in the web because with the current manufacturing technique there would be an unacceptable superposition of fabrics (as shown in FIG. 7) precisely in the area that is most prone to accumulating defects (porosities, resin accumulation, etc.), the radius or elbow of the stringer. As observed in said FIG. 7, to obtain reinforcements using the conventional manufacturing technique for manufacturing T-shaped stringers, the ends of the reinforcing fabrics of the web (9) would be superimposed on the ends of the reinforcing fabrics of the foot (10), which is not allowed by manufacturing standards.

On the other hand, a tool in the form of a mold that has to copy the shape of the profile is used in a final phase of manufacturing the stringers, and in the case of I-shaped or J-shaped profiles, the mold is complex because it has to provide stability to the "cantilever" of those profiles. Depending on the curvature of the panel where the foot rests and, given that the head of an I-shaped or J-shaped profile is perpendicular to the web, the male mold can have demolding problems.

SUMMARY

The present invention solves in a fully satisfactory manner the drawback described above by means of the subject matter defined in the attached independent claims.

The invention relates to a stringer, i.e., to a stiffening and structural longitudinal element for the skin of aircraft airfoil surfaces, such as wings, fuselage skins, or horizontal (HTP) or vertical (VTP) stabilizers. The stringer of the invention is characterized by the possibility of incorporating two separate and independent reinforcement areas, one in the foot and the other at the end of the web (head) of the stringer.

A first aspect of the invention relates to a reinforced stringer, which is formed by a plurality of superimposed plies or fabrics of composite material reinforced with unidirectional fibers, i.e., with the same orientation in the same ply. The stringer comprises a foot for the attachment to an aircraft skin panel and a web attached to said foot by means of one of the longitudinal edges of the web, both elements together forming a profile with an L-shaped or T-shaped section.

Said plies can be referred to as continuous plies because they extend over a majority surface, preferably over the entire surface of the foot and of the web of the stringer, i.e., over virtually the entire or preferably the entire surface of the web and the foot. The stringer is characterized in that it incorporates at least one widening of its section, i.e., a segment that is wider than the rest of the section of the stringer, where said widening extends from a free edge of the stringer to an internal termination edge, i.e., it extends from the edge or from close to the edge corresponding to the head of the web or to the free edges of the foot, to a termination edge located in an internal area of the section spaced from the edges of the stringer.

In the present description, the term section refers to a section that is transverse to the stringer with respect to the longitudinal axis thereof.

Said widening is formed by a localized stack of reinforcing plies or fabrics (intended for forming the reinforcement of the stringer) of composite material, i.e., the plies are arranged on top of one another, either intercalated with already existing continuous plies or applied directly between them in direct contact, forming a compact block of plies or fabrics, which is subsequently intercalated with continuous plies.

The reinforcing plies are applied in a localized manner in the section of the stringer, i.e., the stack does not cover the entire section of the stringer, but extends in a demarcated segment that starts at one of the free edges of the stringer and ends at an internal edge of said section.

The widening or reinforcement can extend along all or along a majority portion of the length of the stringer, or it can cover one or several segments in the longitudinal direction of the stringer. For example, it can locally have a widening in a segment of the stringer, for example, between two ribs of the structure of the aircraft, as needed.

Similarly, the width of the widening or widenings existing in a stringer does not have to be the same, but it can have segments with widenings with a different thickness according to if it is necessary to reinforce the different segments of the stringer.

The reinforcements of the web and of the foot are independent, i.e., the reinforcing plies forming the reinforcement of the foot are not in direct contact with the reinforcing plies of the web, therefore there is a central segment of the stringer formed exclusively by the basic stacking of continuous plies.

The reinforcing plies are integrated with the remaining plies during the process of manufacture, being embedded, i.e., within the stringer, and arranged parallel to the continuous plies on which they are superimposed and to which they are attached. The reinforcing fabrics and continuous fabrics can have the same or different orientation, as appropriate.

In the optimal configuration, the reinforcing plies are preferably intercalated with continuous plies, i.e., a reinforcing ply or several reinforcing plies superimposed directly on one another, arranged above and below continuous plies, and therefore the continuous plies and the reinforcing plies are alternated in the stack.

Due to design rules, no more than 3 fabrics with the same orientation can be stacked consecutively. Given that the widening is preferably obtained with fabrics with the same orientation, to comply with said design rule, three reinforcing fabrics at most are stacked consecutively, and that group of three reinforcing fabrics is subsequently covered with one or more continuous basic fabrics with an orientation other than that of said reinforcing fabrics.

A second aspect of the invention relates to a method of manufacturing stringers, such as the reinforced stringer described above, which comprises manufacturing L-shaped stringers incorporating reinforcing plies or fabrics integrated during the basic stacking of continuous plies, said reinforcing plies being placed at the end of the web of the stringer (head) and/or in the two parts of the foot in the case of a T-shaped profile.

More specifically, the method of the invention comprises stacking a plurality of continuous plies of composite material, forming a generally planar or horizontal sheet, such that said continuous plies extend from end to end of said sheet both in the section and in the length thereof and form the basic stack of the stringer. In the method, at least one widening is formed in said sheet by means of stacking reinforcing plies of composite material in a localized manner, i.e., in a demarcated segment, which are placed on continuous plies, being superimposed on them in a parallel manner.

Said reinforcing plies are placed in correspondence with one of the ends, such that one of the edges of the reinforcing plies coincides (at the same level as or is aligned) with one of the termination edges of the sheet. The other edge of the reinforcing plies end in an internal area of the sheet spaced from the aforementioned termination edge, but maintaining a central segment of the section formed exclusively by continuous plies, i.e., lacking reinforcing plies.

As explained above, the reinforcing plies preferably have the same orientation, and one, two or at most three reinforcing plies are stacked consecutively. That group of at most three reinforcing plies is subsequently covered with one or more basic fabrics with an orientation other than that of said reinforcing fabrics.

Subsequently and once the reinforcing plies necessary to form one or two reinforcements (widenings) are placed at the ends of the sheet, said planar sheet is shaped, i.e., it is folded on itself so that it adopts an L-shape. The obtained L-shaped profile will comprise a foot and a web attached to said foot by means of one of its longitudinal edges.

Finally, the L-shaped profile is cured. Nevertheless, if a T-shaped profile is to be manufactured, two L-shaped profiles like those previously formed are simply placed such that they are attached by the web to define a T-shaped section, and both L-shaped profiles are jointly cured, obtaining a stringer with a T-shaped section.

The invention provides a more structurally effective stringer because the inertia thereof is increased, which in turn allows reducing the overall thickness of the section of the stringer. Furthermore, tolerance to stringer impact damage, for example impacts caused by tools during assembly or maintenance tasks, increases.

Unlike known processes for obtaining reinforcements such as that shown in FIGS. 1 and 2, which require a substantial modification of the tool and process of manufacture, the stringer of the invention does not involve significantly modifying the process of manufacture because it only requires stacking the reinforcing plies.

Having two possible separate reinforcement areas, one in the foot and the other at the end of the web, allows defining three separate areas in the profile of the stringer: the foot, the head of the web, and the intermediate area between both located in correspondence with the central elbow of the stringer, where there are no reinforcing plies, and it is therefore formed only by the basic stacking of continuous plies.

Since the two reinforcements are independent, i.e., they can be independently sized and configured, the stacking of plies independently in each of the reinforcements and in the intermediate area can be optimized. This independence between the reinforcements allows the stringer to be more structurally effective and more geometrically optimizable, which allows concentrating a greater surface area in the head of the web, in turn providing more inertia to the profile of the stringer.

Furthermore, the geometric optimization allows having a structurally better stacking in the foot of the stringer with respect to the interface with the rib or frame, or any other structural element resting on said foot.

The combination of the properties and advantages discussed above further allow being able to reduce the weight of the stringer.

BRIEF DESCRIPTION OF THE DRAWINGS

To complement the description that is being made and for the purpose of aiding to better understand the features of the invention according to a preferred practical embodiment thereof, a set of drawings is attached as an integral part of this description in which the following has been depicted with an illustrative and non-limiting character.

DETAILED DESCRIPTION

Figure 3:
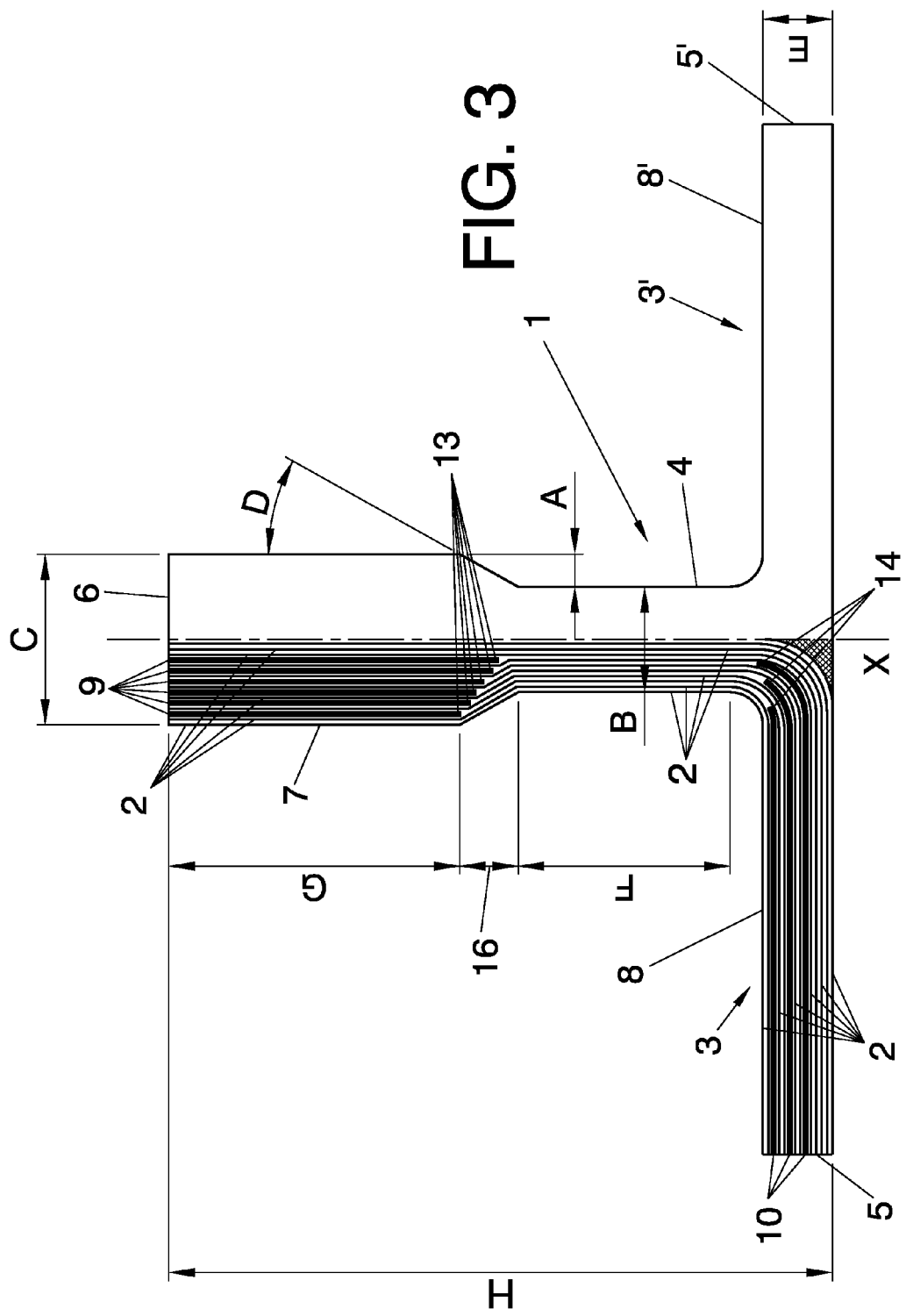
FIG. 3 shows a cross-section view of a stringer according to the invention with intercalated reinforcing plies, where the plies corresponding only to an L-shaped profile have been depicted. The solid line shows the outline of the right half, corresponding to a T-shaped profile formed by the attachment of two attached L-shaped profiles, where the distribution of plies of the right part would be symmetrical to that of the left part. The reinforcing fabrics are depicted with a thicker solid line to distinguish them from the continuous fabrics.

FIG. 3 shows a preferred embodiment of a reinforced stringer (1) according to the invention, which is conventionally formed by a plurality of continuous plies (2) of composite material, superimposed on one another forming the basic stack of the stringer. The stringer has a foot (3, 3') for the attachment to an aircraft skin panel (not depicted), and a web (4) attached to said foot (3, 3') by means of one of its longitudinal edges.

Figure 5:
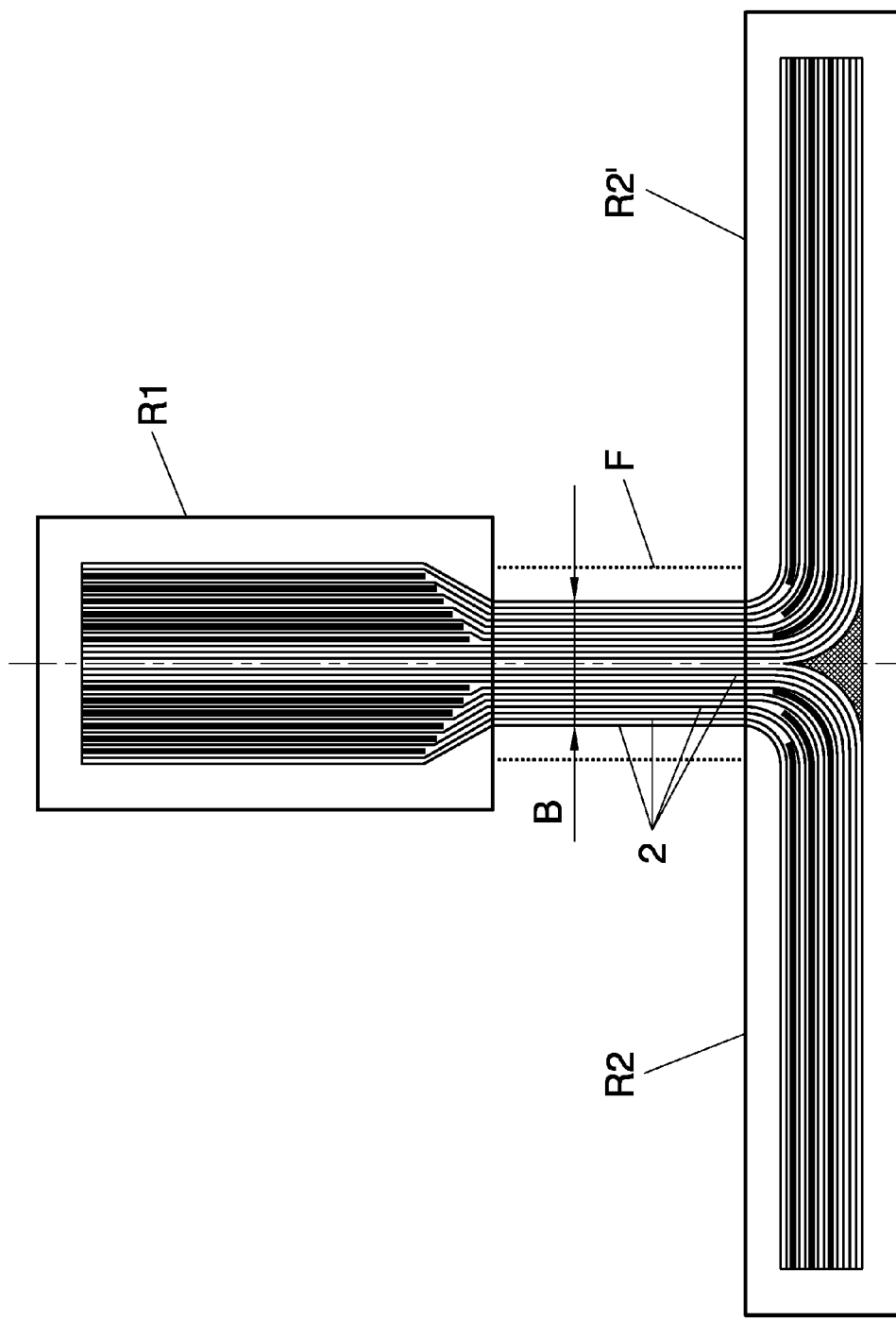
FIG. 5 shows another cross-section view of an alternative embodiment of the invention, where the different areas of the stringer are highlighted in a type of frame.

The stringer (1) can consist of a profile with an L-shaped section such as that depicted in FIG. 3 or it can consist of a T-shaped profile such as that of FIG. 5, which would be formed by the attachment and co-curing of two identical L-shaped profiles, a T-shaped profile as indicated by the outline depicted in FIG. 3 being obtained.

The plies (2) are continuous because they extend from end to end of the section of the stringer without interruptions, i.e., from the free end (5, 5') of the foot (3, 3') to the free end (6) of the web (4). These continuous plies (2) likewise extend from end to end in the longitudinal direction of the stringer.

The stringer (1) of the invention incorporates one or two separate and independent reinforcement segments, one in the foot and the other at the end of the web (head) of the stringer, said reinforcements consisting of a widening of the section of the stringer. In the case of FIG. 3, the stringer (1) incorporates a first widening (7) in the web (4), and a second widening (8) in the foot (3) of the stringer. In the case of a T-shaped profile, there are respective widenings in the web (8, 8'), and in the feet (3, 3').

The widenings (7, 8) are formed by incorporating reinforcing plies of composite material in localized segments of the stringer and stacking said reinforcing plies together with the continuous plies (2), such that the reinforcing plies are embedded within the stringer forming an integral part thereof after the joint curing.

More specifically, a first stack of reinforcing plies (9) is incorporated in the head of the web to form the widening (7) of the web, and a second stack of reinforcing plies (10) is incorporated to form the widening (8) of the foot.

The reinforcements or widenings are preferably obtained by intercalating reinforcing plies in the basic stack of continuous plies (2), as depicted in FIGS. 3 and 5. Said intercalating consists of alternating reinforcing plies (9, 10) with continuous plies (2) during the stacking process, such that one or several reinforcing plies are arranged or intercalated between two continuous adjacent plies, as is particularly shown in FIG. 3. Alternatively, groups of two or three reinforcing plies (9, 10) superimposed on one another can be placed such that said group of reinforcing plies has continuous plies intercalated therein.

In another preferred embodiment of the invention depicted in FIG. 4, the widenings are obtained forming separately compact blocks by means of directly stacking reinforcing plies (9, 10), which are subsequently inserted in the basic stack of continuous plies. There is a first compact block (11) for reinforcing the web (4), which is formed by a group of reinforcing plies (9) stacked directly one on top of the other. Once that compact block is formed, it is placed on already existing continuous plies (2) and is covered with other continuous plies such that it is embedded within the stringer. The entire set of plies is finally cured, an integral body being formed.

Similarly for the reinforcement of the foot (2, 2'), a second compact block (12) formed by a stack of reinforcing plies (10) is separately formed, said stack being subsequently integrated in the process of stacking plies, being embedded in the stringer as shown FIG. 4.

Figure 4:
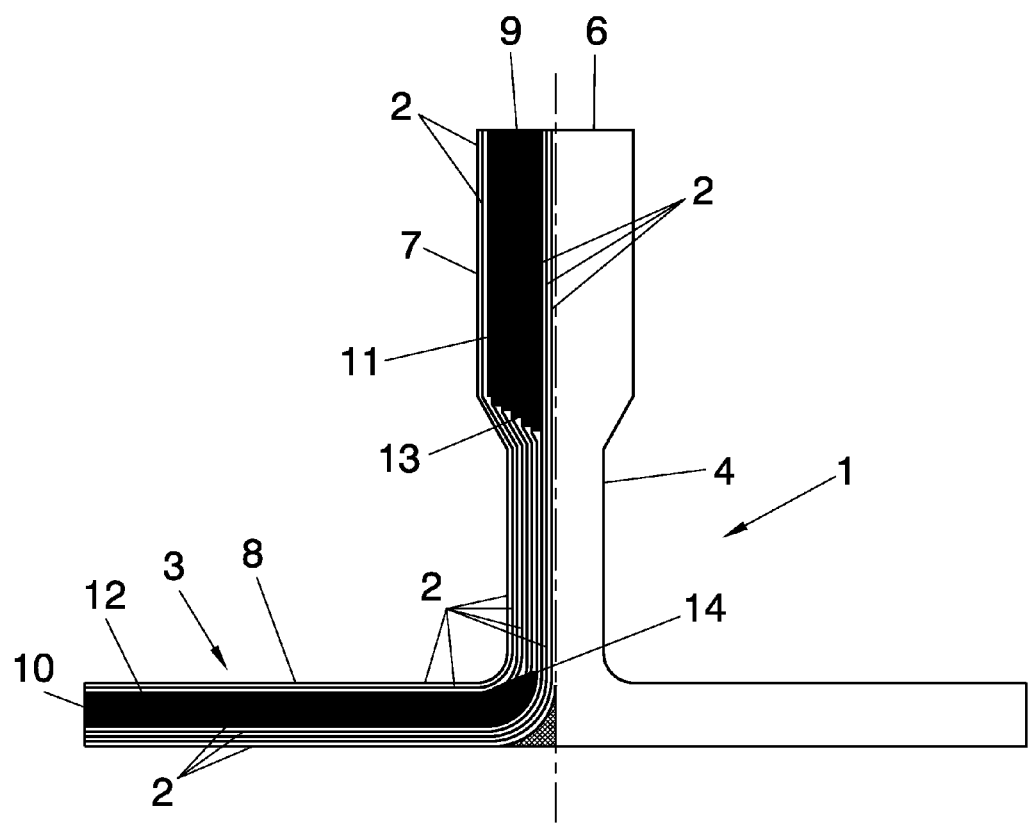
FIG. 4 shows a depiction of an alternative embodiment of the invention similar to that of FIG. 3, in which the reinforcements are obtained by means of compact blocks.

As seen in FIGS. 3-5, the reinforcing plies (9, 10) are arranged parallel to the part of the continuous plies (2) on which they are superimposed and with which they are co-cured. Therefore, the reinforcing plies (9) of the web have a vertical arrangement and are parallel to the web, and the reinforcing plies (10) of the foot have a horizontal arrangement and are parallel to the foot (3, 3').

The reinforcing plies (9, 10) preferably extend from a free edge of the section of the stringer to an internal termination edge in the stringer. Specifically, the reinforcing plies (9) extend from the same free end (6) of the web (4) to a termination edge (13) located in the web (4). In turn, the reinforcing plies (10) of the foot extend from the free edge (5) of the foot to a termination edge (14) located in the radius, i.e., in the area of attachment between web and foot of the stringer.

FIG. 5 shows this arrangement of the reinforcements, in summary one reinforcement in the head of the web (R1) and another in the foot or in the feet of the stringer (R2, R2'), giving rise to a central segment (F) comprised between said reinforcements (R1, R2/R2') formed exclusively by continuous plies (2). The width (B) of the central segment (F) is also constant.

In view of FIG. 3, it can be observed that the width (C) of the widening (7) of the web (4) is constant in a majority segment (G) thereof. In turn, the width (E) of the widening (8) of the foot (2) is constant, in this case in the entire extension of the foot. Logically, width (C) is greater than width (B), and in turn width (B) of the central segment (F) is greater than width (E) of the foot. The width (E) of the reinforcement of the foot is greater than half the width (B).

The invention envisages that both the widening of the head of the web and the widening of the foot end in the stringer, progressively reducing the width (C, E) thereof. More specifically in the case of the widening formed by intercalated fabrics of FIG. 3, that progressive reduction of the width is obtained by ending the reinforcing plies (9) in a staggered manner, i.e., each ply is longer than the adjacent ply located immediately above it when seen from the central axis (X) of the web outwards. Therefore, the outermost reinforcing ply is the shortest, and the innermost ply is the longest.

Similarly, in the embodiment of FIG. 4 the compact blocks forming the reinforcements end at their internal end by means of a progressive reduction of their width.

This manner of ending the reinforcing plies involves forming termination or transition area (16) located between the widening (R1) of the web and the central segment (F), in which the width of the section of the stringer is progressively reduced and adopts a trapezoidal shape defining an inclined segment having an angle (D) with respect to the axis "X". The advantage of this transition area with a progressive width reduction is that it softens the contour and prevents concentrations of stresses that could give rise to fabrics becoming unbonded (porosities) or cracks. At the same time, demolding problems during the profile shaping process are prevented.

The reinforcements of the web and of the foot are completely independent, so a stringer according to the invention can have only reinforcement of the web, only reinforcement of the foot (two reinforcements in the case of a T-shaped profile) or reinforcements in the web and in the foot. The fact that the reinforcements are independent means that they can be sized as needed to optimize the profile and the weight. This means that each area of the stringer can have the stack and thickness required depending on the application rather than having one continuous stack and thickness which often simply adds on unnecessary material. A weight saving is therefore achieved.

The reinforcement of the head of the web makes it wider, which increases the inertia of the profile and further increases the tolerance to impact damage caused by tools during assembly, inspection, etc. The increase in inertia of the profile in turn allows reducing the overall thickness thereof, since it allows reducing the number of continuous plies.

In a preferred embodiment of the invention, the reinforcements of the web and foot extend along all or a majority part of the length of the stringer, as in the cases of FIGS. 4 and 5, for example.

Figure 8:
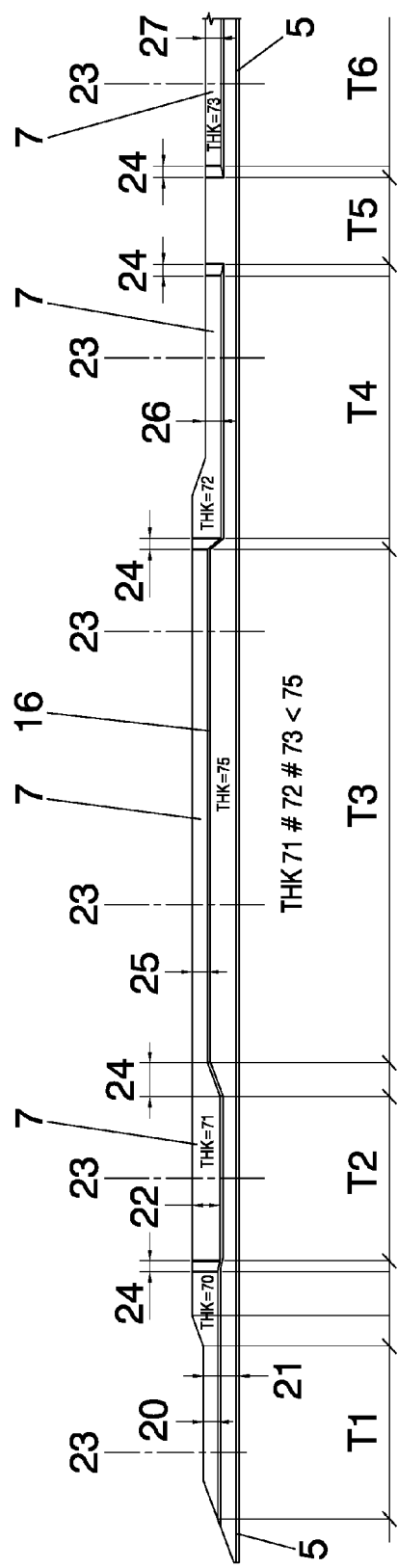
FIG. 8 shows a side elevational view of an embodiment of a stringer according to the invention, provided with reinforcements in the web and foot that vary in height and width along the stringer or are interrupted in different segments thereof. The stringer has changes in the total height (21) thereof, several heights (20, 22, 25, 26, 27) of the reinforcement of the head, and different thicknesses (THK, 70-71-72-73-75) of said reinforcement, and transition areas (24) between said changes.

In other preferred embodiments of the invention such as that shown in FIG. 8, the stringer incorporates segments of the length of the stringer in which the height and/or the width of the reinforcements of the web and foot are different. In the case of the stringer (1) of FIG. 8, it can be observed how the height (G) and the width (C) of the widening (7) of the web vary along the stringer, forming segments with a different section of the reinforcement, which allows optimizing the design of the stringer to adapt it to specific structural requirements, for example, to the presence of other elements of the structure, such as the position of the ribs (23) of an aircraft structure. FIG. 8 shows a first segment (T1) in which the reinforcement (7) has a height (21), a second segment (T2) in which the reinforcement (7) has a height (22) greater than height (21) and is wider than segment (T1).

In a third segment (T3) the height (25) of the reinforcement (7) is reduced with respect to the preceding segments (T1, T2), but the width is maintained with respect to segment (T2). The stringer incorporates a fifth segment (T5) between two segments (T4, T6) in which there is no reinforcement. Transition areas (24) are generated between the different segments, in which areas there is a progressive increase or decrease of the height and/or the width of the reinforcement, bringing about smooth inclinations, preferably $1/100$, to facilitate the demolding from the tool.

The reinforcements of the foot can bring about changes in height and/or width in a manner similar to those shown in FIG. 8, which may or may not coincide with the changes of the reinforcement of the web.

In the method of manufacturing reinforced stringers such as that described above, a plurality of continuous plies of composite material is stacked, forming a substantially planar sheet. Reinforcing plies of composite material are applied in a localized manner on said continuous plies during the process of forming the sheet, forming the widenings of the web and/or foot as described above.

Figure 1:
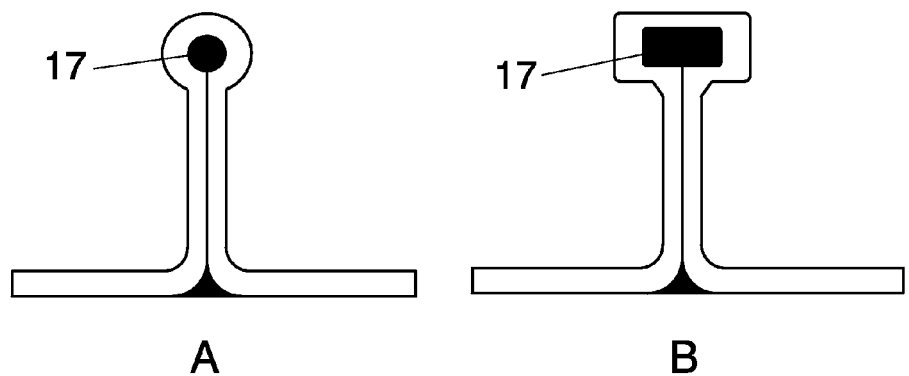
FIG. 1 shows two cross-section views of stringers with a T-shaped profile of the state of the art, provided with reinforcements in the head of the web.
Figure 2:
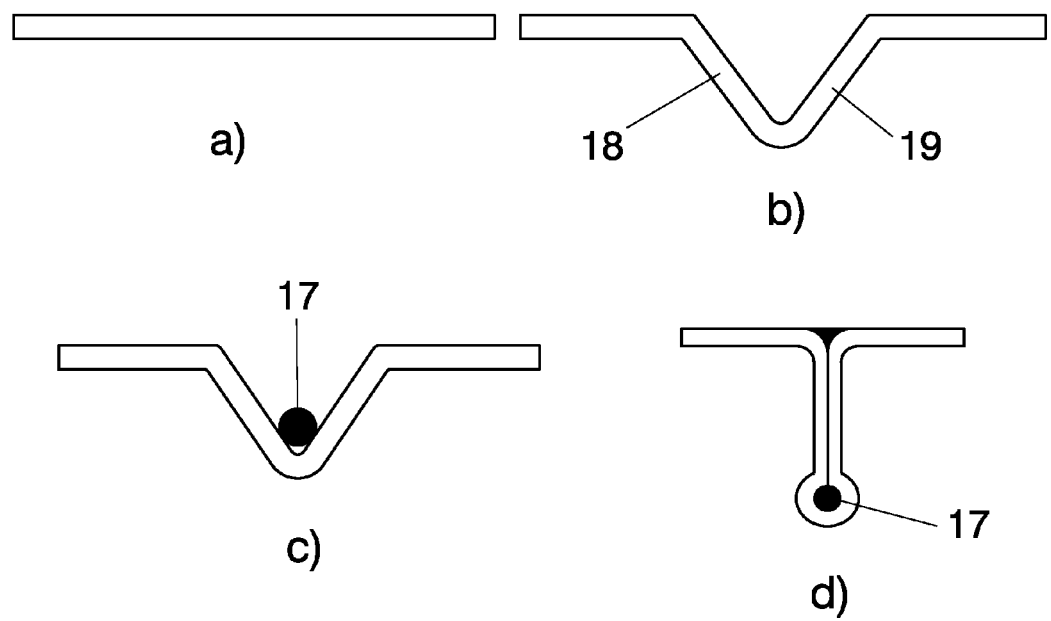
FIG. 2 shows a sequence of drawings illustrating the process of manufacturing the stringer of FIG. 1.

Said sheet is shaped so that it adopts an L-shape. Two independent L-shaped profiles are attached by the web to form a T-shaped profile. Each L-shaped profile is stacked in a planar manner, whereby the reinforcement of the web is achieved by simply adding plies during that stacking. The process is therefore very simple, and the reinforcement is further integrated in the basic stack (formed by the continuous fabrics) of the L-shaped profile instead of being an independent body added at the end, as occurs in the state of the art shown in FIG. 1. The fact that the reinforcement is an integral part of the basic stack greatly enhances the mechanical properties of the reinforced profile of the invention.

Figure 6:
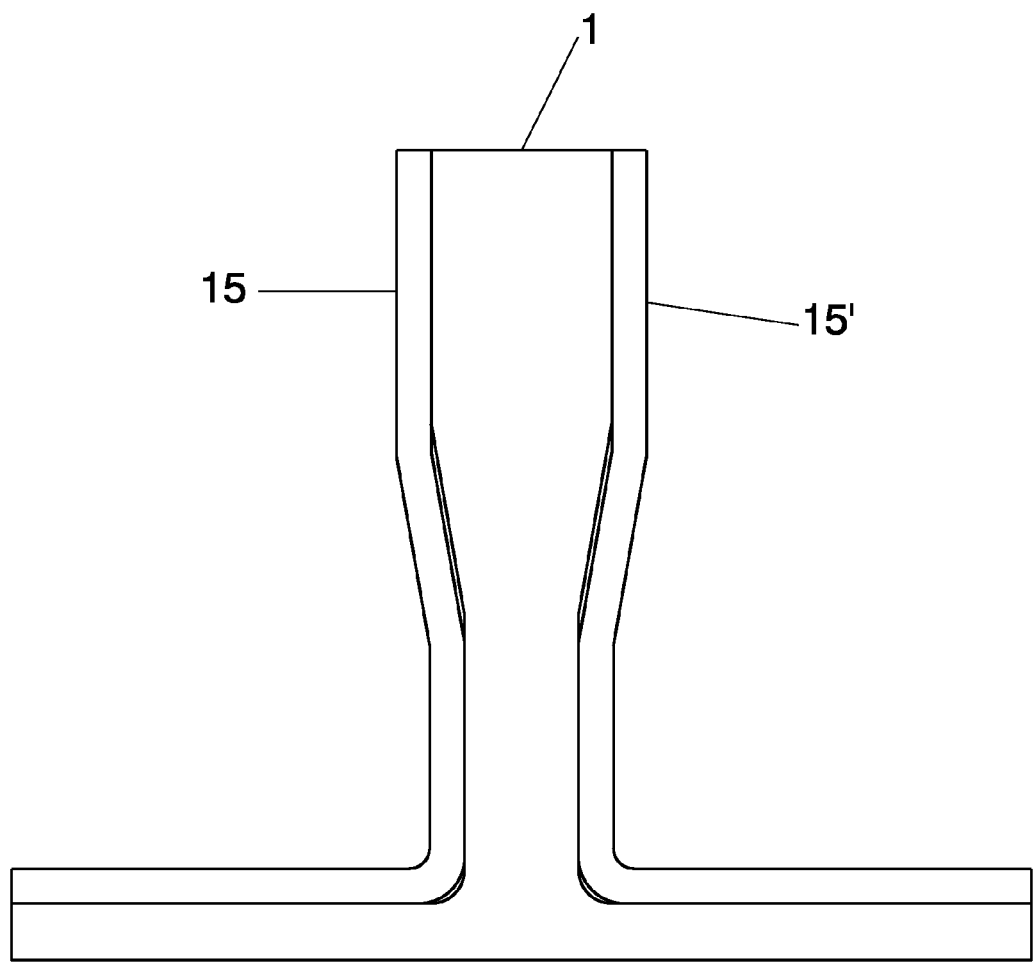
FIG. 6 schematically shows the application of a manufacturing tool for shaping a profile of the stringer according to the invention.
Figure 7:
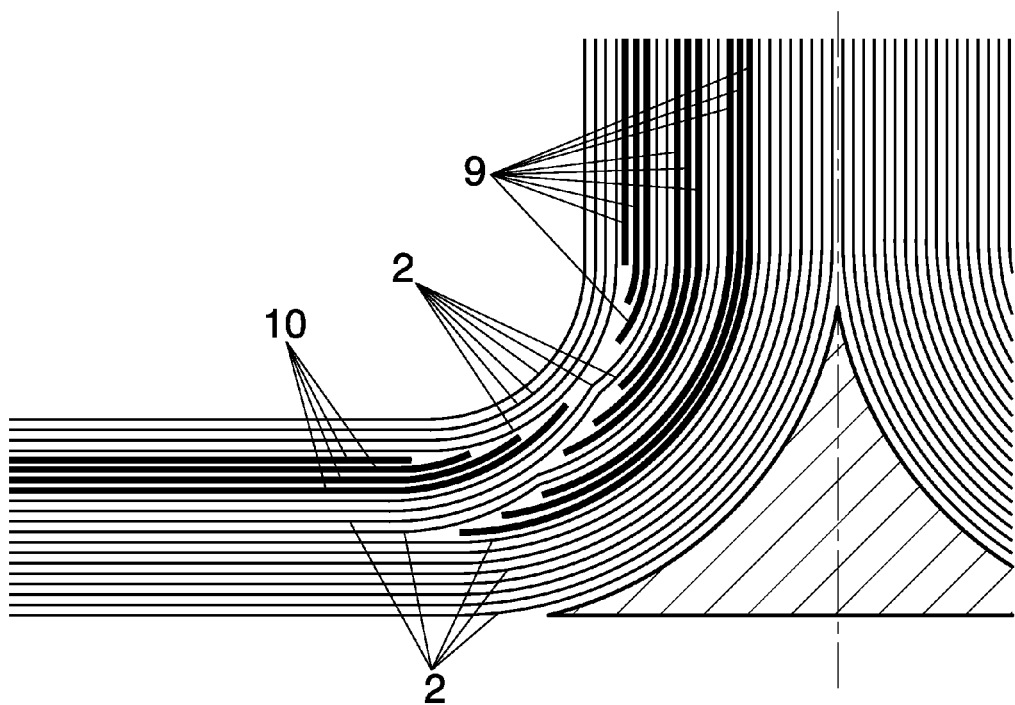
FIG. 7 shows the arrangement of plies that would be obtained with the current manufacturing technique, which would produce a superposition of fabrics precisely in the radius.

As a result of the smooth contour of the resulting profile, the stringer of the invention does not have the demolding problems discussed above in relation to the state of the art because the tool necessary for shaping the head with the reinforcement are respective metal L-shaped molds (15, 15') as shown in FIG. 6, with a slightly curved stepping that is effortlessly demolded without any head interference problem.

The invention claimed is:

1. A T-shaped reinforced stringer comprising a plurality of superimposed plies of composite material, wherein a foot is defined for attachment to an aircraft skin panel, and a web attached to the foot by one of its longitudinal edges, such that both elements together form a profile with an L-shaped or T-shaped section,
- where the plies of composite material are continuous and extend over a majority surface of the foot and of the web of the stringer,
- wherein the stringer incorporates at least one widening of the section of the stringer, where the widening is formed by a localized stack of reinforcing plies of composite material, and
- the reinforcing plies being embedded within the stringer and arranged parallel to the continuous plies on which they are superimposed,
- where the widening of the section extends from a free edge of the stringer to an internal termination edge in the stringer;
- wherein the T-shaped reinforced stringer is symmetric about an axis bisecting the web.

2. The T-shaped reinforced stringer according to claim 1, wherein the reinforcing plies are intercalated with continuous plies, and the reinforcing plies and the continuous plies are co-cured.

3. The T-shaped reinforced stringer according to claim 1, wherein the reinforcing plies are superimposed directly on top of one another forming a compact block, and said compact block is embedded within the stringer.

4. The T-shaped reinforced stringer according to claim 1, comprising a widening in the web of the stringer which extends from the free edge of the web to a termination edge spaced from said free edge, and wherein a width of that widening is constant in a majority segment of the section thereof.

5. The T-shaped reinforced stringer according to claim 1, comprising at least one widening in the foot of the stringer which extends from a free edge of the foot to an elbow for connecting with the web, and wherein a width of that widening is constant in a majority segment of the section thereof.

6. The T-shaped reinforced stringer according to claim 4, wherein the stringer has a T-shaped section, and comprising a widening in the web and a widening in each part the foot.

7. The T-shaped reinforced stringer according to claim 1, wherein the web has a central segment having a constant section formed only by continuous plies, which extends from an elbow of the section of the stringer to the termination edge of the widening of the web, and wherein a width of this central segment is less than that of the widening of the web.

8. The T-shaped reinforced stringer according to claim 1, wherein an end of the widening of the web and of the widening of the foot inside the stringer end with a progressive reduction of their width.

9. The T-shaped reinforced stringer according to claim 1, wherein the at least one widening extends along all or a majority part of a length of the stringer.

10. The T-shaped reinforced stringer according to claim 1, wherein the at least one widening extends in one or more segments located in a longitudinal direction of the stringer.

11. The T-shaped reinforced stringer according to claim 1, comprising segments in which a height and/or a width of reinforcements of the web and/or foot are different.

* * * * *